Figure 1A:
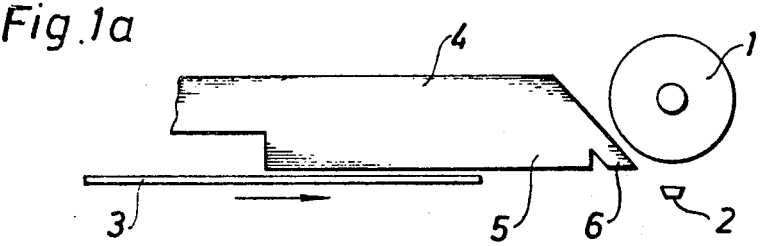

United States Patent [19]

Pupp et al.

[11] 4,430,140
[45] Feb. 7, 1984

[54] METHOD AND AN ARRANGEMENT FOR THE MANUFACTURE OF CASINGS

[75] Inventors: Herwig Pupp; Otto B. Andersson, both of Lund; Jan-Erik Nilsson, Staffanstorp, all of Sweden

[73] Assignee: Tetra Pak International AB, Lund, Sweden

[21] Appl. No.: 245,017

[22] Filed: Mar. 18, 1981

Related U.S. Application Data

[62] Division of Ser. No. 972,802, Dec. 26, 1978, Pat. No. 4,284,448.

[30] Foreign Application Priority Data

Dec. 23, 1977 [SE] Sweden ............................... 7714734

[51] Int. Cl.³ ................... B32B 31/00; G05G 15/00; H05B 3/02; B39C 27/00
[52] U.S. Cl. ...................................... 156/356; 156/84; 156/359; 156/497; 156/582; 219/367; 425/402
[58] Field of Search ............... 156/356, 357, 359, 364, 156/380, 429, 450, 481, 494, 497, 499, 583.4, 84, 86, 214, 215, 218, 582, 358, 366, 379.6; 219/373, 367, 229, 537, 475; 53/442; 264/342 R, 230, DIG. 71; 425/342, 342.1, 402

[56] References Cited

U.S. PATENT DOCUMENTS

| | | | |
|---|---|---|---|
| 3,753,832 | 8/1973 | Ueneziale, Jr. | 156/322 |
| 3,884,746 | 5/1975 | Loliger et al. | 499/499 |
| 4,151,024 | 4/1976 | Ohlsson | 156/84 |
| 4,218,608 | 8/1980 | Maroney | 219/373 |

Primary Examiner—Edward C. Kimlin
Assistant Examiner—Louis Falasco
Attorney, Agent, or Firm—Burns, Doane, Swecker & Mathis

[57] ABSTRACT

In the packaging field certain types of packages are manufactured from pre-shaped, cylindrical casings made from a heat-shrinkable laminate. The casings are formed by winding a material sheet around a mandrel and subsequent sealing together of the overlapping ends of the sheet. However, because of the stiffness of the material the leading end of the sheet protrudes tangentially from the mandrel during the winding and prevents an accurate adaptation of the material sheet to the surface of the mandrel.

According to the method and arrangement of this invention this disadvantage is avoided in that the leading end of the sheet is pre-heated on the side facing the mandrel to such a degree, that the shrinking is initialled. The shrinking of one side only results in that the leading end of the material sheet is given a curved shape with a radius that coincides with the radius of the mandrel, and consequently the leading end is no longer an obstacle to the winding.

6 Claims, 6 Drawing Figures

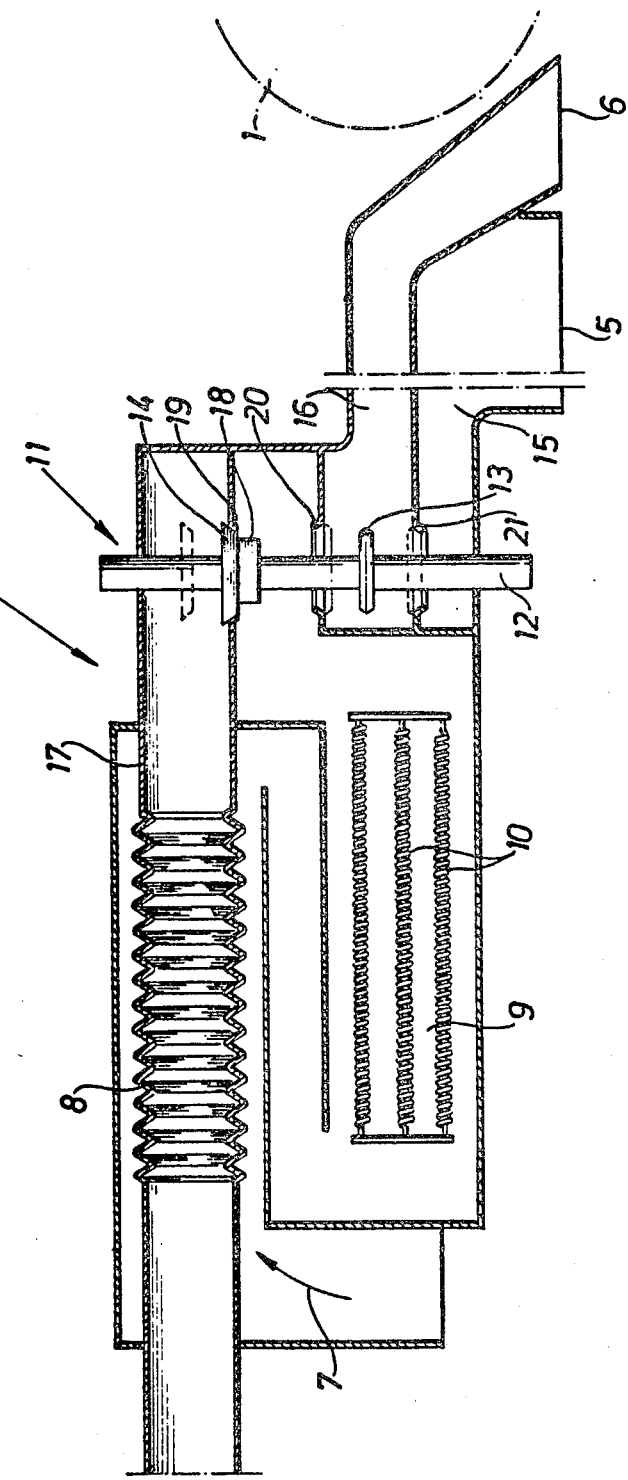

METHOD AND AN ARRANGEMENT FOR THE MANUFACTURE OF CASINGS

This is a division of Application Ser. No. 972,802, filed Dec. 26, 1978 now U.S. Pat. No. 4,284,448.

The present invention relates to a method in the manufacture of casings of thermoplastic, heat-shrinkable material by winding of a material sheet around a forming tool and joining together the ends of the sheet.

The invention relates also to an arrangement for the realization of the method, which arrangement comprises a forming tool for the winding of a material sheet to the shape of a casing and elements for the joining together of the ends of the material sheet in the shape of a casing.

Casings of thermoplastic, heat-shrinkable material are frequently manufactured as an intermediate or semifinished product in the manufacture of packing containers, drinking cups, protective casings etc. The casings are most frequently of cylindrical or conical shape and are intended to be given in a subsequent shrinkage the desired final shape which is adapted to the final area of application.

In the manufacture of a packing container of e.g. the type which is described in Swedish Pat. No. 381,442, to which reference is made, a sheet of laminated material is used comprising a central layer of foamed plastic which is covered on both sides by homogeneous thermoplastic layers. The laminate has been treated during manufacture in order to give it heat-shrinking properties, that is to say, the material will shrink when it is heated above a certain temperature limit.

The laminate sheet is wound around a forming tool in the shape of a rotatable, substantially cylindrical mandrel so that the two ends of the sheet will somewhat overlap one another, whereupon the ends are made to lie against one another and are sealed together so that a casing with a longitudinal overlap joint is formed. The ready-shaped casing is then moved to a profiled mandrel end where the casing is placed so that with a part of its length it extends beyond the end of the mandrel. A plate of thermoplastic material, e.g. of the same material as the casing, is then placed against the end surface of the mandrel, whereupon the material is heated up above its softening temperature so that the free end of the casing shrinks and adapts itself to the shape of the mandrel. By complementary heating the free edge surface of the casing is softened so that when subsequently pressure is exercised it is heat-sealed to the edge area of the material plate. The forming of the container body is then complete.

When during the course of manufacture described the material sheet is to be wound around the forming tool, the material sheet is fed to the forming tool mainly tangentially, whereupon the front end of the material sheet is retained mechanically against the shell surface of the forming tool and the forming tool is made to rotate through approx. 360°. The mechanical retaining device provided on the forming tool is in the form of a small finger which extends axially in relation to the forming tool and is movable between two positions, namely an open position at a distance from the shell surface and a closed position in contact with the shell surface. When a material sheet is introduced, its front end is fed into the space between the retaining finger in its open position and the shell surface, whereupon the finger is moved to the closed position so that the front end of the material sheet is held in place tightly. To make possible the subsequent sealing of the ends of the wound material sheet it is essential that the material sheet before the clamping of its front end should be advanced to such an extent that the clamping finger engages at a certain distance inside the material sheet so that a free end is available which is sufficiently large to allow the formation of a longitudinal joint after the winding has been completed. After clamping between the clamping finger and the shell surface the free end will extend tangentially from the shell surface of the forming device. When the material sheet after rotation of the forming tool has been wound up around the forming tool, the free front end of the sheet prevents the rear end of the sheet from making contact with the shell surface of the forming tool, since the rear end first meets and comes to rest against the front edge of the sheet situated at a distance from the shell surface. When after the heating of the two ends they are pressed together for the forming of the heat-sealed overlap joint, a material surplus exists owing to the unsatisfactory contact of the sheet with the shell surface thus causing the diameter of the casing to increase a little after the sealing which is a disadvantage during the further forming.

The problem described is particularly noticeable when the casings are made of rigid and thick material, e.g. a polystyrene laminate comprising a central layer of foamed polystyrene, which is comparatively thick and is covered on both sides by thin homogeneous layers.

Earlier efforts to solve the problem were concentrated first and foremost on the design of the retaining finger and the area of the shell surface of the forming tool co-operating with the retaining finger with the object of seeking by mechanical means to cause the free material ends to adapt themselves more accurately to the shape of the shell. These efforts, however, met with little success.

It is an object of the present invention to eliminate the above-mentioned disadvantage and to make possible an accurate adaptation of the front end of the material sheet to the shell surface already before the winding of the material sheet around the forming tool.

This object has been achieved in accordance with the invention in that a method for the manufacture of casings from a thermoplastic, heat-shrinkable material by winding of a material sheet around a forming tool and joining together of the ends of the sheet, has been given the characteristic that the material sheet before winding around the forming tool is preheated along its whole length at least on the side facing the forming tool to a temperature which substantially coincides with the softening temperature of the material and that the front end of the material sheet is subjected on the side facing towards the tool to a complementary intensive heating to a temperature which exceeds the temperature at which shrinkage is initiated, so that owing to the shrinkage capacity of the material a curved shape in the direction towards the tool is imparted to the said sheet end. By complementing the softening preheating of the material with an intensive heating of a limited surface area at the front end of the sheet it becomes possible, without mechanical work upon the material sheet to cause this end to be in contact with the shell surface of the forming tool.

An embodiment of the method in accordance with the invention has been given the further characteristic that in case of a substantially cylindrical tool the front end of the sheet is given a curvature, the radius of which largely coincides with the radius of the forming tool.

Another embodiment of the method in accordance with the invention has been given the further characteristic that in the laminated material only the material layer or layers closest to the forming tool is/are heated in the intensive heating phase.

It is another object of the present invention to provide a suitable arrangement for the realization of the method in accordance with the invention, which arrangement in a space and energy saving manner makes possible the realization of the method in accordance with the invention.

It is a further object of the present invention to provide an arrangement in which a single stationary heating unit complies with the heating needs which arise in connection with the winding of the sheet and the forming of the casing.

These and other objects have been achieved in accordance with the invention in that an arrangement for the realization of the method in accordance with the invention comprising a forming tool for the winding of a material sheet to casing-shape and elements for the joining together of the ends of the material sheet in casing-shape has been given the characteristic that the heating set is arranged along a feed track for the material sheet, which set comprises a heating unit for the heating of the main length of the material sheet and an intensive heating unit for the heating of the side of the front end of the sheet which faces towards the forming tool.

An embodiment of the arrangement in accordance with the invention has been given the further characteristic that the intensive heating device is so placed adjoining the forming tool that before the winding of the material sheet around the forming tool it intensively heats the side of the front end of the sheet facing towards the tool and after the winding of the sheet it heats the ends of the sheet so as to make possible their heat-sealing.

A further embodiment of the arrangement in accordance with the invention has been given the further characteristic that the heating set is stationary.

Another embodiment of the arrangement in accordance with the invention has been given the further characteristic that the preheating unit as well as the intensive heating unit has a working width which substantially coincides with or slightly exceeds the corresponding width of the material sheet, that the preheating unit and the intensive heating unit together have a working length corresponding to the length of the material sheet and that the working length of the intensive heating unit is smaller by ⅓rd than the working length of the preheating unit.

Another preferred embodiment of the arrangement in accordance with the invention has been given the further characteristic that the heating unit is placed between the preheating unit and the forming tool.

Another preferred embodiment of the arrangement in accordance with the invention has been given the further characteristic that the heating unit is of the hot-air type and comprises a valve for conducting the hot air to the preheating unit and/or the intensive heating unit.

Another preferred embodiment of the arrangement in accordance with the invention has finally been given the characteristic that the valve has three working positions, namely a first position wherein the supply of hot air to the heating units is interrupted, a second position wherein hot air is supplied to both heating units, and a third position wherein hot air is supplied to the intensive heating unit.

The invention will now be described in more detail with special reference to the enclosed schematic drawings which only show the parts necessary for the understanding of the invention.

FIGS. 1 a–e shows in successive steps the conversion of a material sheet to casing-shape in accordance with the method according to the invention, and FIG. 2 is a section through a preferred embodiment of a heating set in accordance with the invention.

Figure 1B:
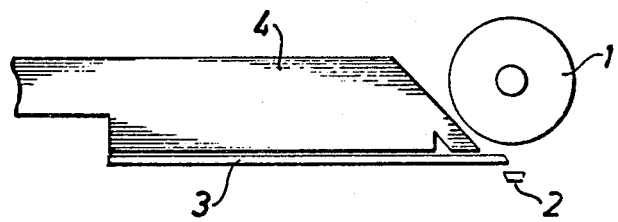
Figure 1C:
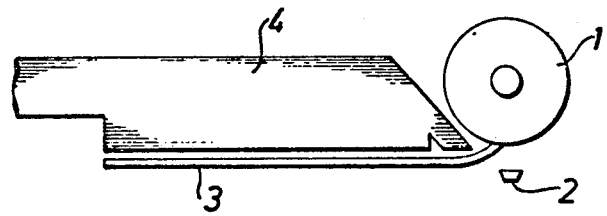
Figure 1D:
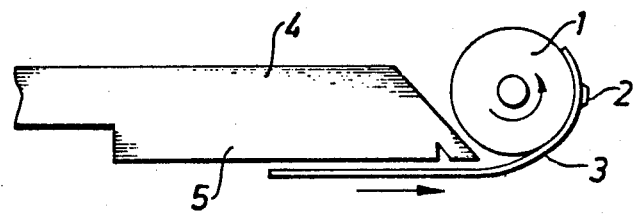

FIGS. 1a–1e show essential machine parts for the manufacture of casings from thermoplastic, heat-shrinkable material. More particularly each of the figures shows a forming tool 1 which is constituted of a substantially cylindrical mandrel. The forming tool 1 is provided with a retaining finger 2 which is movable between a position at a distance from the forming tool (FIGS. 1a, b, c) and a position where it rests against the forming tool (FIGS. 1d and e).

A material sheet 3 is fed to the space between the forming tool 1 and the retaining finger 2 along a track extending tangentially in relation to the forming tool. Alongside this track there is a heating set 4 which in the preferred embodiment described here consists of a hot-air set with a preheating unit 5 and an intensive heating unit 6. Both the preheating unit 5 as well as the intensive heating unit 6 in accordance with the invention are constituted of arrangements of hot-air nozzles which are directed towards the said feed track of the material sheet. The heating set 4 is described in more detail with special reference to FIG. 2.

In the manufacture of a casing of thermoplastic, heat-shrinkable material in accordance with the method according to the invention, a material sheet 3 is fed along the said track tangentially in direction towards the forming tool 1. The material sheet 3 has a length which is adapted so that after winding around the forming tool 1 a sufficiently wide overlap area is formed to make a sealing possible. The direction of feed of the material sheet 3 is indicated in FIG. 1a by means of an arrow. In the position shown the forming tool 1 is stationary, the retaining finger 2 is at a distance from the surface of the forming device and both nozzles 5 and 6 of the heating set 4 are inactive.

FIG. 1b shows an instant during the formation of the casing when the material sheet momentarily stops in a position just opposite the heating set 4. The forming tool 1 is stationary and the retaining finger 2 is in its open position. Hot air is supplied to the heating set 4 and is distributed between the preheating unit 5 and the intensive heating unit 6 so that the material sheet 3 is heated along its whole length on the side facing towards the heating set, which coincides with the side of the sheet which in the subsequent winding faces the mandrel. On the assumption that the material sheet consists of the material combination mentioned earlier, that is to say a comparatively thick (approx. 1 mm) central layer of foamed polystyrene which is covered on both sides by thin layers (0.1–0.2 mm) of homogeneous polystyrene, it is heated until the homogeneous layer facing towards the heating set attains a temperature of 100°–110° C. which is a little below the softening temperature of the material.

FIG. 1c corresponds to FIG. 1b in everything except the supply of hot air. The heating of the whole length of the material sheet 3 has now been interrupted and the total amount of hot air is conducted towards the material sheet via the intensive heating nozzle 6. When the material sheet has stopped in the position shown, the intensive heating nozzle is directed towards the material sheet at a little distance inside the front end of the material sheet, and the corresponding area is now heated to a temperature exceeding that at which shrinkage is initiated, that is to say, a temperature of between 120° and 130° C. This causes the heated area of the side of the material facing the nozzle to shrink together so that the front end of the material curves in the direction towards the forming tool 1. When the heating has continued sufficiently long for the front end of the material sheet to have a radius of curvature which substantially coincides with the radius of the cylindrical forming tool, the intensive heating is interrupted and the hot air supply is divided again between the preheating unit 5 and the intensive heating unit 6 in a manner corresponding to that described in connection with FIG. 1b. At the same time the feed of the material sheet 3 is restarted so that the front, curved end of the same is moved in between the forming device 1 and the retaining finger 2 and is held in place in such a position that a free end extends past the finger along the shell surface of the forming device 1.

In FIG. 1d is shown how the material sheet 3 during continued supply of hot air via the preheating unit 5 as well as the intensive heating unit 6 commences to be wound around the forming tool which now commences to rotate in the direction of the arrow. When the material sheet during the winding passes the heating set, a further increase of the temperature of the side facing the set takes place so that this temperature reaches the softening temperature of the material, approx. 110°–120° C., which facilitates the forming of the material sheet to casing-shape and makes possible a winding in accurate adaptation to the shell surface of the forming tool 1.

Figure 1E:
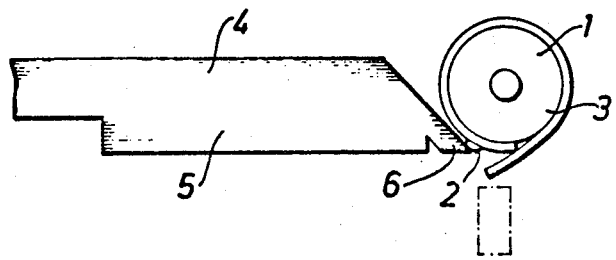

In FIG. 1e it is shown how the forming device 1 after completed winding up of the material sheet 3 is stationary again, the rear end of the sheet overlapping the front end of the sheet and being situated right opposite a pressure device indicated by means of dash-dotted lines. The supply of hot air to the heating set has again been adjusted and the total air stream now passes to the intensive heating unit which owing to its location introduces hot air into the pocket formed between the front end and the rear end of the material sheet. As a result the material surfaces facing one another are heated to a temperature exceeding the melting temperature, approx. 150°–160° C., of the material. When the material after a short time has reached this temperature the pressure device is actuated and presses together the two ends of the material sheet so that a material casing is formed, the inside diameter of which coincides accurately with the outside diameter of the forming tool 1. At the same time the feed of the next material sheet 3 commences and the cycle is repeated in the abovementioned manner with a cycle time of approx. 2 seconds.

Practical tests have shown that the method in accordance with the intention allows a repeated manufacture of casings with a diameter which virtually does not vary at all. This is possible primarily thanks to the bending-in of the front end of the material sheet described, since this bending-in makes possible an accurate adaptation of the material sheet to the mandrel around the whole shell surface. The adaptation is further promoted by the preheating of the side of the material sheet facing the mandrel to the softening temperature of the material. If the preheating is eliminated or if the surface of the material facing the forming tool is not heated to a sufficient degree, that is to say, the region of the softening temperature of the material, the layer of the material facing towards the forming tool will on winding to casing-shape produce a great number of cracks or crease lines extending axially in relation to the forming tool so that first of all the inside of the casing will not be cylindrical and secondly it will have unsatisfactory dimensional accuracy.

The method described is particularly suitable in the manufacture of casings of laminated material which comprises a centrally situated, relatively thick layer of foamed plastic, since such material cracks easily when it is subjected to bending stresses above a certain limit. With this type of material it is also very simple to dose the amount of heat supplied so that the required bending of the front end of the material sheet is obtained since the foamed plastic layer situated centrally in the material sheet acts as an insulating layer and prevents the heat from spreading to the opposite surface layer of the material sheet. As a result it will be simple during the intensive heating to limit the heating to the material layer or layers which during winding will be closest to the forming tool, and this ensures a readily controllable heating and hence a simple controlling of the bending so that the radius of curvature can be made to coincide with the radius of the forming tool.

As described, the bending of the front end of the material sheet takes place completely without any mechanical work upon the material sheet which is a great advantage since the foamed plastics used can easily be deformed when they are subjected simultaneously to heating and to mechanical working. The absence of a mechanical forming device is an advantage also purely practically, since such a device is quite bulky and difficult to place in the area around the rotatable forming tool which area in practice is also provided with further devices for the guiding of the material sheet and the forming of the casing, which devices, however, are not shown, since they are well-known to those versed in the art and are of no importance for the understanding of the invention.

To allow the realization of the method in accordance with the invention it has proved appropriate to design a special arrangement for the heating of the material sheet. A preferred embodiment of this arrangement will now be described with special reference to FIG. 2.

The arrangement, as mentioned earlier, comprises a heating set 4 which is situated close to the forming tool 1 and comprises the two heating units 5 and 6. The heating units consist of hot-air nozzles which are located in the direct vicinity and which are pointed towards the track along which the material sheets are fed to the forming tool. Both the preheating unit 5 and the intensive heating unit 6 have a working width which corresponds to or slightly exceeds the corresponding width of the material sheet. The working length of the preheating unit 5 is slightly less than the length of the material sheet whilst the intensive heating unit has an appreciably shorter working length which is ⅔rd less than the length of the preheating unit. The preheating unit and the intensive heating unit together however, have a working length corresponding to the length of the material sheet. The terms "working width" and "working length" are here intended to mean the width and length respectively of the surface of the stationary material sheet which is heated by the heating unit, that is to say, which is heated to at least the desired temperature.

The outlet of the intensive heating unit has preferably the form of a gap whose longitudinal direction is parallel with the axial center line of the forming tool. The intensive heating unit moreover is directed so that hot air can be blown obliquely forwards against the forming tool.

The air current is generated by means of a fan (not shown) and flows in the direction of the arrow 7 through a heat exchanger 8, through a heating chamber 9, with heating elements in the form of electric resistance wires 10, and past a valve set 11 which distributes the air between a first duct 15, which is connected to the heating unit 5, a second duct 16 which is connected to the intensive heating unit 6, and a third duct 17, which conducts the air via the heat exchanger 8 to atmosphere.

The valve set 11 comprises a valve spindle 12 which via openings in intermediate walls arranged between the different air ducts extends through all the air ducts in the following order (from the top downwards in FIG. 2): outlet duct 17, supply duct, outlet duct 16 and outlet duct 15. The valve spindle 12, which is axially movable between three positions, carries a disc valve 13 which is fixed firmly to the spindle 12, and a valve disc 14 which is axially displaceable in relation to the spindle. The movement of this valve disc 14 in relation to the spindle is limited in one direction (downwards in FIG. 2) by a stop 18 on the spindle 12. The valve discs 13, 14 are adapted so as to co-operate with valve seats 19–21 which form the previously mentioned openings in the walls between the different air ducts. The valve seat 19 is situated between the supply duct and the third outlet duct 17 and is adapted so as to co-operate with the valve disc 14 which is axially displaceable in relation to the spindle whilst the valve seats 20 and 21 are situated between the supply duct and the second outlet duct 16 and between the second outlet duct 16 and the first outlet duct 15 respectively, and are adapted so as to co-operate with the valve disc 13 which is firmly fixed to the spindle.

The valve set has three working positions, namely a first position wherein the supply of hot air to the heating units is interrupted, a second position wherein hot air is supplied to both heating units and a third position wherein hot air is supplied to the intensive heating unit. In the first position the valve spindle 12 is in its topmost end position when the fixed valve disc 13 rests against the valve seat 20 and prevents supply of hot air to the heating units. The valve disc 14 has been lifted via the stop on the valve spindle to an upper open position and the hot air can flow out freely through the third outlet duct 17, via the heat exchanger 8 and out to atmosphere. The valve positions described are shown by means of dash-dotted lines. The valve set 11 occupies the first working position when material is being fed, that is to say, in the position which corresponds to FIG. 1a.

In the second position of the valve set 11 the valve spindle 12 is in an intermediate position and allows a flow of hot air to the intensive heating unit as well as to the preheating unit. In this position the valve spindle has been lowered so that the valve disc 13 is just halfway between the two valve seats 20 and 21 whilst the valve disc 14 rests against the valve seat 19 and prevents hot air from flowing out through the third outlet duct 17. In this position the valve discs are shown in fully drawn lines and it can be seen from the drawing that the valve disc 13 does not rest against the valve seat 20 or the valve seat 21 so that the air stream from the inlet duct can pass to the preheating unit 5 as well as to the intensive heating unit 6. This working position is assumed by the valve set during the heating of the stationary material sheet (FIG. 1b) and during the winding phase (FIG. 1d).

In the third working position of the valve set the total stream of hot air is supplied to the intensive heating unit 6. In this position the valve spindle is in a lower end position within the valve disc 13 being moved to engage the valve seat 21 which is shown in broken lines in FIG. 2. The movable valve disc 14, owing to its axial displaceability in relation to the valve spindle 12, remains in engagement with the valve seat 19. As a result of the valve disc 13 resting against the valve seat 21 the flow of hot air to the preheating unit 5 is hindered and the total hot air stream flows instead from the inlet duct through the valve seat 20 and via the second outlet duct 16 to the intensive heating unit 6. This working position is assumed by the valve on the one hand when intensive heating is applied to the front end of the sheet (FIG. 1c) and on the other hand during intensive heating of the two overlapping sheet ends (FIG. 1e).

The design of the arrangement with stationary heating units between which hot air is distributed in accordance with a certain pattern constitutes the basis of a reliable operation and makes possible the change-over of hot air during the different, individually very short working phases which have been described. The rapid change-over of the flow path of the hot air is also facilitated by the valve arrangement which can be moved simply and rapidly between the different, accurate working positions.

The arrangement in accordance with the invention has been described with a heating set of the hot-air type which has proved to be the optimum solution in the production of casings of laminated material comprising layers of foamed plastic. However, this does not mean that on working with a different sheet material the heating set cannot be designed with another working medium. In certain cases, for example, a heating set of the infrared type may be appropriate.

Depending on whether the laminated material is symmetrical or not, whether it contains layers of different plastic material types or depending on other factors, it may also be suitable to preheat the total sheet, that is to say, preheat both sides of the sheet, which can be done simply in accordance with the invention in that a part of the air introduced to the preheating unit is conducted around the material sheet and is made to act also upon the opposite side of the same.

We claim:

1. An arrangement for the manufacture of casings of thermoplastic, heat-shrinkable material comprising forming tool means for the winding of a material sheet to casing-shape and means for joining together ends of the material sheet in casing-shape, heating set means arranged along a feed track for the material sheet, said heating set means having a preheating unit for the heating of the main length of the material sheet, and an intensive heating unit for the heating of a front end of the sheet facing towards the forming tool means, the heating set means being a hot air type and comprising a valve which selectively conducts a hot air stream to the preheating unit and/or to the intensive heating unit.

2. The arrangement in accordance with claim 1, wherein the intensive heating unit is arranged adjoining the forming tool means such that before the winding of the material sheet around the forming tool the side of the front end of the sheet facing towards the tool means is intensively heated and such that after the winding of the sheet the ends of the sheet are intensively heated to facilitate heat-sealing.

3. The arrangement in accordance with claim 1 or 2, wherein the heating set means is stationary.

4. The arrangement in accordance with claim 1 or 2, wherein the preheating unit and the intensive heating unit each have a working width which substantially coincides with or slightly exceeds the corresponding width of the material sheet, the preheating unit and the intensive heating unit having a combined working length corresponding to the length of the material sheet and the working length of the intensive heating unit being one third smaller than the working length of the preheating unit.

5. The arrangement in accordance with claim 1 or 2, wherein the intensive heating unit is arranged between the preheating unit and the forming tool means.

6. The arrangement in accordance with claim 1, wherein the valve has three working positions, a first position in which the supply of hot air to the heating units is interrupted, a second position in which hot air is supplied to both heating units and a third position in which hot air is supplied to the intensive heating unit.

* * * * *